May 9, 1933.  W. A. GIBBONS ET AL  1,907,535
MANDREL
Filed Aug. 29, 1930   3 Sheets-Sheet 1

INVENTORS
Willis A. Gibbons
Harold T. Bartin
BY
ATTORNEY

May 9, 1933.  W. A. GIBBONS ET AL  1,907,535
MANDREL
Filed Aug. 29, 1930   3 Sheets-Sheet 2
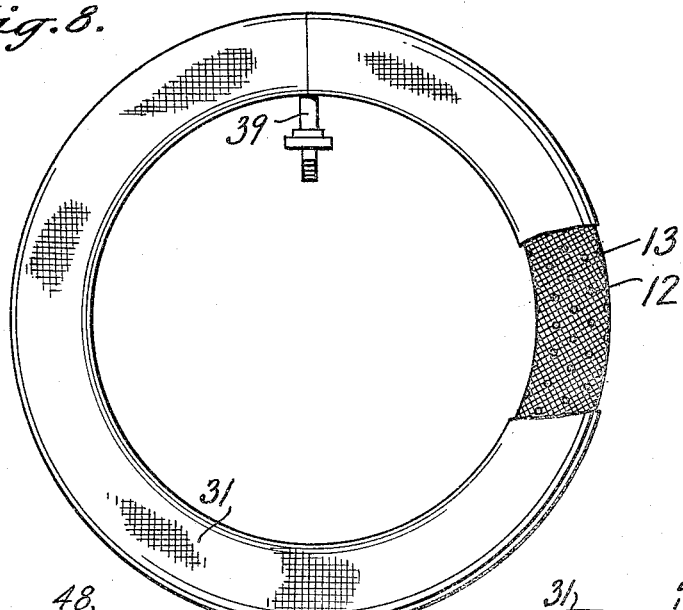
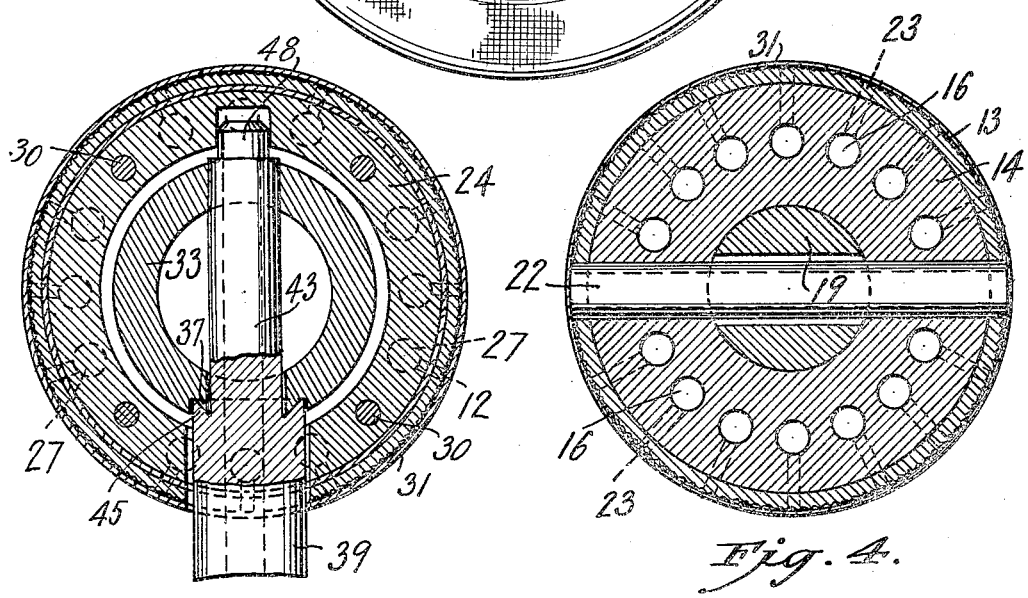
INVENTORS
Willis A. Gibbons
Harold T. Battin
BY Walter L. Tipes
ATTORNEY May 9, 1933. W. A. GIBBONS ET AL 1,907,535
MANDREL
Filed Aug. 29, 1930 3 Sheets-Sheet 3
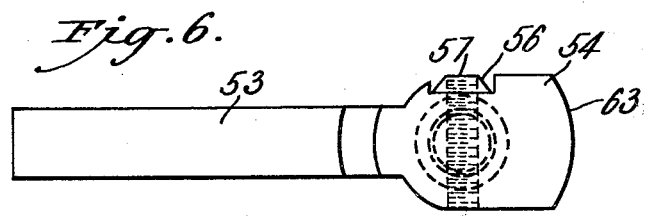
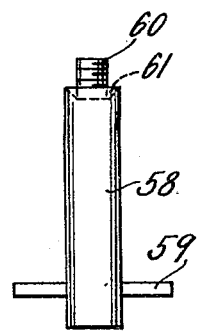
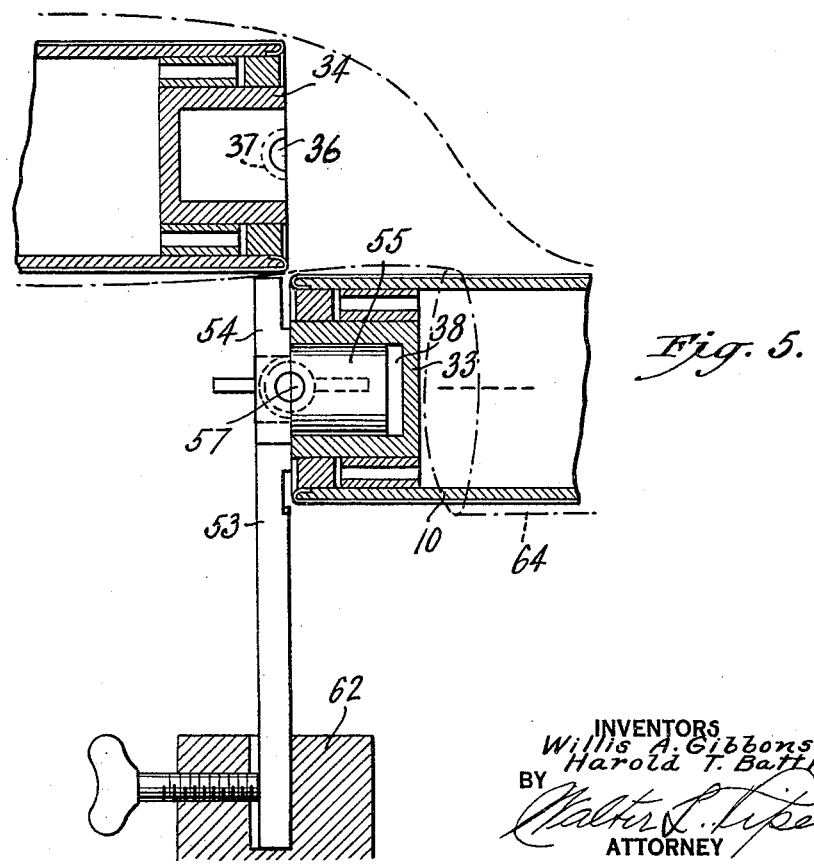

Patented May 9, 1933

1,907,535

UNITED STATES PATENT OFFICE

WILLIS A. GIBBONS, OF MONTCLAIR, AND HAROLD T. BATTIN, OF RIDGEWOOD, NEW JERSEY, ASSIGNORS TO MORGAN & WRIGHT, OF DETROIT, MICHIGAN, A CORPORATION OF MICHIGAN

MANDREL

Application filed August 29, 1930. Serial No. 478,714.

Our present invention relates to the manufacture of latex tubes and more particularly to an improved mandrel for use in manufacturing endless latex tubes.

Tubes for tires such as automobile tires are preferably made at the present time by dipping a mandrel into a latex or similar material bath and after the required thickness of latex or similar material is deposited on or built up on the mandrel, the endless tube is vulcanized and then removed from the mandrel. To facilitate this removal, the mandrels have heretofore been made of a plurality of sections and such sections after being detached from each other are removed through the valve stem hole which is made in the endless tube simultaneously with the building of the tube. Such mandrels are objectionable in that they are difficult to manipulate and after disassembling and removing from a built up tube, must be reassembled before being again put into service. Some of the latter forms of mandrels on which endless latex tubes may be built have been built of a plurality of arcuate sections hingedly mounted together and while these mandrels are an improvement over those heretofore used, are yet objectionable in that it is difficult to provide a proper hinging means which can be operated without disturbing too many of the elements of the mandrel. In building endless latex tubes by the deposition process, a filter bed of fabric is invariably placed on the outer surface of the mandrel and in former hingedly mounted arcuate members constituting a mandrel, the fabric covering must be made in a plurality of sections, one for each of the arcuate members.

In our present invention, we have obviated the difficulties of prior structures and have devised an articulated annular mandrel in which the various sections are arranged to swivel with respect to each other through an angle sufficient to allow the endless latex tube to be readily removed from the mandrel and by utilizing this form of swivel connection, find it possible to use a fabric covering or sleeve which is common to all of the arcuate members constituting the mandrel.

Further, we have improved the means for locking the arcuate members together so as to form a rigid structure and which locking means after completion of the endless latex tube, may have substituted therefor a holding member which may be securely attached to the mandrel by the inclusion of a portion of the means constituting the locking device.

An object of our invention, therefore, is an improved sectional mandrel for manufacturing endles tubes.

Another object of our invention is an improved swivel joint for a sectional endless mandrel.

A further object of our invention is an improved locking means for sectional mandrels.

A still further object of our invention is an improved holding means for sectional mandrels.

In the accompanying drawings, illustrating a preferred embodiment of our invention:

Fig. 3 is a section on the line 3—3 of Fig. 1;

Fig. 4 is a section on the line 4—4 of Fig. 2;

Fig. 5 is a section on a smaller scale corresponding to the line 5—5 of Fig. 1 which illustrates the holding means applied to one end of the mandrel when opened.

Fig. 6 is a plan view of the holding means;

Fig. 7 is a detail of the locking means for the holder, and

Fig. 8 is an elevation of the mandrel.

Figure 1:
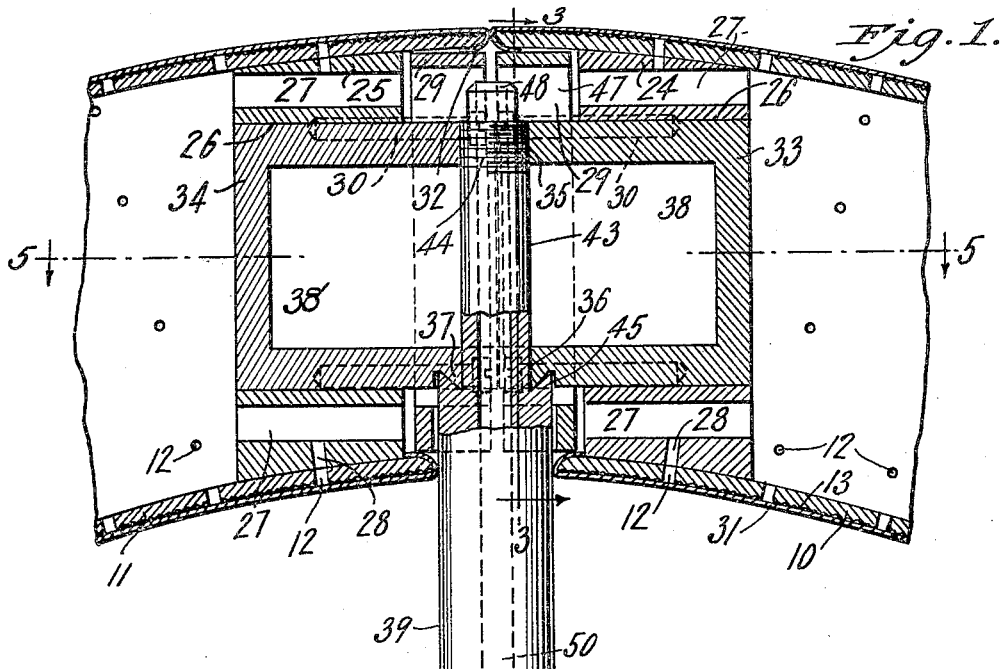
Figure 1 is a sectional elevation of a portion of a mandrel when closed, illustrating the locking device.
Figure 2:
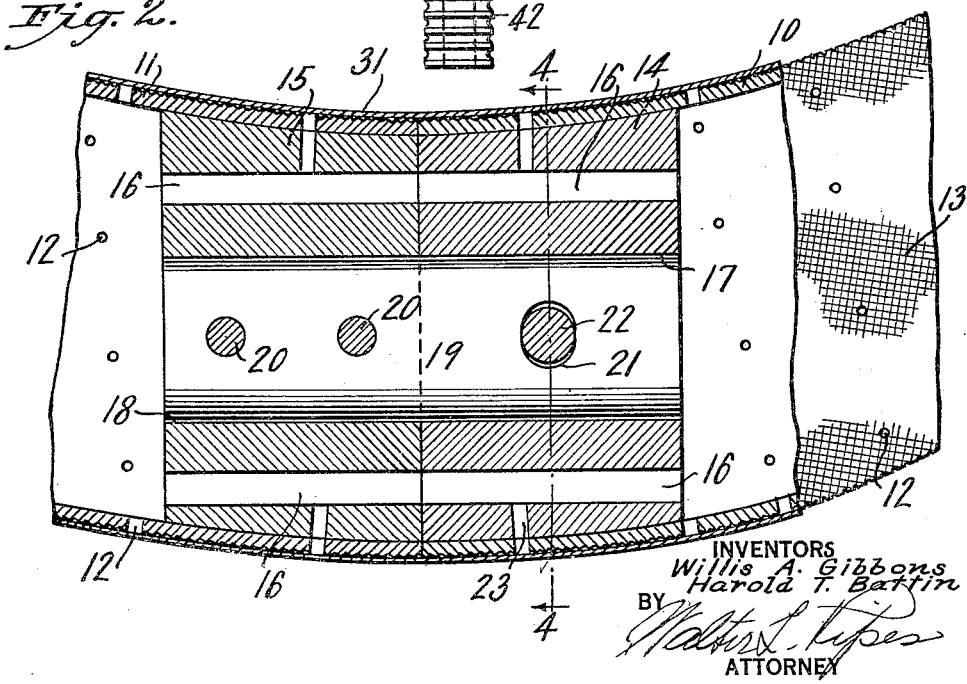
Fig. 2 is a sectional elevation of a mandrel illustrating the swivel joint for the mandrel sections.

Referring to the drawings, 10 and 11 designate arcuate members substantially circular in cross section and semi-circular in form, such members lying in a single vertical plane and being brought together at the top and bottom portions as illustrated in Figs. 1 and 2. The arcuate members 10 and 11 are hollow, as clearly shown in the drawings, and throughout their area are provided with a plurality of perforations 12. The outer surfaces of the arcuate members 10 and 11 are knurled as indicated at 13, this knurling providing a network of shallow grooves throughout the entire outer surface thereof.

Referring now to Fig. 2, there is shown inserted in the open end of the lower portion of the arcuate member 10 a plug 14; this plug being securely attached to the member 10 by friction, or pinning, or in any other suitable or convenient manner. Similarly located in the open lower end of the arcuate member 11 is a plug 15, similar in construction to the plug 14. The plugs 14 and 15 are provided with a plurality of longitudinally extending holes 16. These holes are in alignment with each other, as clearly shown in Fig. 2. Also the plugs 14 and 15 are provided with aligned central passages 17 and 18, respectively, and fitting into the passage 18 as a drive fit is a shaft 19, pins 20 extending through the body of the plugs 15 and through the shaft 19 to insure the shaft 19 remaining in fixed position relative to the plug 15. This shaft 19 extends outwardly beyond the plug 15 and the extending end enters into the passage 17 in the plug 14 as a rotating fit. The extending end of the shaft 19 has formed therein an oval shaped slot 21 and through this slot extends a pin or shaft 22, having its ends anchored in the plug 14. It will be obvious, therefore, that the plug 14 and, therefore, the arcuate member 10 has a limited swiveling movement on the shaft 19, the limit of movement being determined by the oval slot 21. The perforations 12 in the arcuate members 10 and 11 in that portion of which member occupied by the plugs 14 and 15 extend through such plugs 14 and 15 and communicate with the drain holes 16, as indicated by the numeral 23 in Fig. 2.

Referring now to Fig. 1, it will be noted that the open ends of the upper portions of the arcuate members 10 and 11 have fitted therein plugs 24 and 25, respectively, and such plugs are secured in any convenient manner as by means of a force fit or by pins. Each of the plugs 24 and 25 are provided with central longitudinal passages 26, such passages being in alignment with each other and circumferentially arranged about the central passages 26 and extending longitudinally through the plug 24 are drain holes 27. The perforations 12 in the arcuate members 10 and 11 in that portion of the members occupied by the plugs 24 and 25 are continued through the plug members into the drain holes 27, as indicated by the reference numeral 28. It will be noted from an inspection of Fig. 1, that the outer faces of the plugs 24 and 25 are inset from the cooperating edges of the arcuate members 10 and 11 and the space thus provided is substantially filled by fabric binding sleeves 29, which are retained in place by a plurality of screws 30.

The entire annulus comprised of the arcuate members 10 and 11 are covered by a fabric sleeve 31, the ends of such sleeves folding over the opposing faces or edges of the arcuate members, such folded over edges being clamped between the inner edge of the arcuate members 10 and 11 and the outer periphery of the sleeves 29, as indicated by the reference numeral 32 in Fig. 1.

33 designates a plug that has a force fit in a passage 26 in the plug 24 and the outer face or edge of this plug 33 terminates practically in the plane passing through the outer open end of the arcuate member 10. 34 designates a plug similar to the plug 33 that has a force fit in the passage 26 in the plug 25 and the outer face or edge of this plug 34 lies practically in the same plane as the open end of the arcuate member 11. On the extreme upper end of the plugs 33 and 34, as viewed in Fig. 1 is formed a drilled and tapped hole 35, and this hole 35 is in alignment with a clearance hole 36 in the plugs 33 and 34 on the lower face thereof. About the hole 36 and on the outer lower surface of the plugs 33 and 34 is formed a beveled seat 37 comprising two semi-circular portions, one on each plug. Each of the plugs 33 and 34 is recessed as indicated at 38 and 38', respectively, for a purpose to be hereinafter described. 39 designates a locking bolt having arranged thereon intermediate its ends a member 40 and by means of which the same may be turned and a reduced portion 41 provided with a plurality of parallelly arranged grooves 42 to assist in holding a conduit for vacuum or pressure thereon.

The upper end of the locking bolt 39 as viewed in Fig. 1 is reduced in diameter as indicated at 43 and this reduced end passes through the clearance hole 33 and the end of this reduced portion is threaded as indicated at 44, such threaded portion screwing into the threaded hole 35. At the junction of the reduced end 33 of the locking bolt 39 is formed a seat member 45 which cooperates with the seat 37, above described as being formed in the plugs 33 and 34. At the extreme end of the reduced portion 43 of the locking bolt 39 and extending into a chamber 47 formed in the sleeves 29 is a nipple 48. The locking bolt 39 is provided with a through passage 50 and by means of which communication is had with the chamber 47, and, therefore, with the interior of the arcuate members 10 and 11 by way of the draining holes 27. When it is desired to lock the arcuate members 10 and 11 together, the ends of such members are brought into position as shown in Fig. 1. The locking bolt 39 inserted through the hole 36 and the threads 44 on the end of the reduced portion 33 engages with the threaded hole 35. The seat members 45 and 37 engage each other and prevent outward movement of the arcuate members 10 and 11 rendering effective the threads 34 with the threaded hole 35 and drawing the ends of the arcuate members 10 and 11 into locked position.

Assuming the parts of the device to have been constructed and arranged as above described and that it is desired to form an endless latex tube thereon, a conduit (not shown) is attached to the reduced portion 41 of the locking bolt 39 and the entire assembly dipped into a solution of whiting or chalk. A thin coat of such whiting or chalk is, therefore, deposited on the fabric sleeve 31. The annular mandrel composed of the arcuate members 10 and 11 is then withdrawn from the solution and the coating of whiting or chalk allowed to dry. Vacuum is then turned into the passage 50 through the conduit referred to and the entire assembly dipped into a bath of latex or similar material when a coating of latex or similar material will be deposited on the fabric coat 31 of the annular mandrel. After vulcanization, the formed latex or similar material or endless tube is in condition to be removed from the mandrel.

Referring now to Figs. 5, 6 and 7, there is shown a holder comprised of an arm 53 having an enlarged end 54 and on one face of such enlargement 54 is riveted a cylindrical member 55 of a diameter to permit the same to be freely inserted in and rotated in the recess in either of the plugs 33 or 34. On one side of the enlargement 54 is formed an arcuate seat member 56 similar to one of the semi-circular portions of the circular seat member 37 formed in the plugs 33 and 34 extending through the enlarged portion 54 and centrally arranged with respect to the seat portion 56 is a tapped hole 57. 58 designates a holding rod provided with a means 59 for rotating the same and having formed thereon on the end remote from the turning means 59 a threaded portion 60 and a recessed circular seat portion 61 similar to the seat portion 45 formed on the locking bolt 39. The holder 53 is adapted to be clamped in a holder of any desired kind as, for example, the holder 62 illustrated in Fig. 5.

Assuming the conditions with regard to the endless tube to be as above described and that it is desired to remove the same from the annular member comprised of the arcuate members 10 and 11, the operator will remove the locking bolt 39 from the assembly shown in Fig. 1 and will force the enlarged end 54 together with cylindrical member 55 through the valve hole formed in the endless tube and will place the cylindrical member into either the recess 38 in the plug 33 or the recess 38' in the plug 34. Assuming such cylindrical member to be placed in the recess 38 in the plug 33, the operator will now rotate the holder 53 through the angle sufficiently to expose the tapped hole 57, allowing the holding pin 58 to be inserted through the stretched valve hole and bringing the threaded end 60 into engagement with the threaded hole 57. The holding bolt 58 is now rotated until the recessed seat 61 thereon engages with that portion of the seat 37 on the plug 33 and with the seat portion 56 on the enlargement 54; by this means securely clamping the holder 53 on to the arcuate member 10. It will be noted that the outer end of the enlarged portion 54 is rounded as shown at 63, and, therefore, there is practically a line contact of such rounded portion with the outer surface of the arcuate member 11, and the parts have now assumed the position shown in Fig. 5. The latex endless tube is indicated by the reference numeral 64 and the operator by inserting an air hose between the tube 64 and the arcuate member 10 and turning the air under pressure through such hose, will inflate the tube 64 sufficiently to allow the endless latex tube 64 to be readily withdrawn from the annular mandrel.

While we have necessarily described the preferred embodiment of our invention somewhat in detail, it is to be understood that we may vary the size, shape and arrangement of the parts constituting the present invention without departing from the spirit of the same.

Having thus described our invention what we claim and desire to protect by Letters Patent is:

1. An improved mandrel for manufacturing endless latex tubes comprising a pair of arcuate members forming an annulus, cooperating plugs in the abutting ends of the arcuate members, and abutting complementary seat elements formed on one side of each of said plugs, and defining a passage, complementary threaded elements formed on the opposite side of each of said plugs and defining a passage in alignment with said first passage, a locking bolt provided with a threaded end engaging with the threaded elements and a seat member formed on the body of the locking bolt and engaging with the seat elements, whereby the ends of the arcuate members are securely locked together.

2. An improved mandrel for manufacturing endless latex tubes comprising a pair of arcuate members forming an annulus, cooperating plugs in the abutting ends of the arcuate members and abutting together, said plugs being provided with recesses, complementary seat elements formed on one side of each of said plugs and defining a passage, complementary threaded elements formed on the opposite side of each of said plugs and defining a passage in alignment with said first passage, a locking bolt provided with a threaded end engaging with the threaded elements, and a seat member formed on the body of the locking bolt and engaging with the seat elements, a holding arm having a complementary seat on one end for engagement with the seat element on either of said plugs, a cylindrical member on the holding arm engaging in the recess of either of the plugs, a threaded passage in said holding arm in alignment with the complementary seat, and a holder plug screwing into the threaded passage and provided with a seat member for engaging the complementary seat elements on the holding arm and on one of the plugs whereby the holding arm is adjustably secured to one of the arcuate members.

3. An improved mandrel for manufacturing endless latex tubes comprising a pair of arcuate members forming an annulus, cooperating locking members on the abutting faces of said arcuate members, locking projections on said members, and a locking bolt engaging with said projections for locking the arcuate members into a rigid structure.

4. An improved mandrel for manufacturing endless latex tubes, comprising a pair of arcuate members forming an annulus, cooperating locking members on the abutting faces of said arcuate members, a threaded passage formed in the abutting faces of said cooperating locking members, a seat formed in the abutting faces of said cooperating locking members, a locking bolt provided with a threaded end and with a seat engaging member cooperating with the threaded passage and seat for locking the arcuate members into a rigid structure.

5. An endless mandrel comprising a pair of arcuate members forming an annulus, cooperating locking members on the abutting faces of said arcuate members, a threaded passage formed in the abutting faces of said cooperating locking members, cam faces formed on said locking members, a threaded bolt provided with an undercut shoulder engaging in said threaded passage, and means for locking the arcuate members into a rigid structure.

6. An endless mandrel comprising a plurality of curved sections, a swivel joint for connecting the adjacent ends of a pair of said sections together, said joint comprising a plug fitted in one of said ends, a bolt rotatably mounted in said plug and fixed to the other of said ends, and a pin engaging said bolt and said plugged end for limiting the relative rotative movement of said sections.

7. An endless mandrel comprising a plurality of curved sections, a swivel joint for connecting the ends of a pair of said sections together, said joint comprising a bolt connected to one of said ends and rotatably mounted in the other end, and means engaging said bolt and the rotatably mounted end for limiting the relative rotative movement of said sections.

8. An endless mandrel comprising a plurality of curved sections, a swivel joint for connecting the adjacent ends of a pair of said sections together, said joint comprising a plug fitted in one of said ends, a bolt rotatably mounted in said plug and fixed to the other of said ends, the said plug fitted end, plug and bolt being provided with aligned apertures, and a pin mounted in said apertures, said apertures in either said end or bolt being elongated in cross section in the direction of the swivel for limiting the rotative movement of said sections.

Signed at Passaic, county of Passaic, State of New Jersey, this 22nd and 20th day of August, 1930.

WILLIS A. GIBBONS.
HAROLD T. BATTIN.